United States Patent Office 3,468,894
Patented Sept. 23, 1969

3,468,894
CERTAIN 2-PYRIDYL-SUBSTITUTED INDOLE DERIVATIVES
Heinz A. Pfenninger, New City, N.Y., assignor to Geigy Chemical Corporation, Ardsley, N.Y., a corporation of Delaware
No Drawing. Filed Nov. 29, 1966, Ser. No. 597,575
Int. Cl. C07d 57/00; A61k 25/00
U.S. Cl. 260—294.8                6 Claims

ABSTRACT OF THE DISCLOSURE 2-(pyridyl)-3-methylindoles are useful as diuretics and as cardiovascular agents and in the treatment of hyperaldosteronism.

---

This invention relates to indole derivatives having valuable pharmacological properties. More specifically, the present invention pertains to 2-pyridyl-substituted indole derivatives and their acid addition salts and to processes for the production thereof. This invention further concerns pharmaceutical compositions containing said indole derivatives or their pharmaceutically acceptable acid-addition salts as well as a method for treating a host suffering from hyperaldosteronism and associated disorders by internally administering to said host a therapeutically effective amount of a 2-pyridyl-substituted indole derivative according to the invention or a pharmaceutically acceptable acid-addition salt thereof.

Compounds of the formula

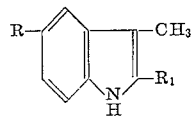

wherein:
R represents hydrogen or halogen, especially chlorine or bromine, and
$R_1$ represents a 3-pyridyl or 4-pyridyl group, and their salts with inorganic or organic acids have not been known up to now.

These compounds have now been found to cause a significant inhibition of the biosynthesis of the adrenocortical hormone aldosterone (11β,21-dihydroxy-3,20-dioxo-4-pregnen-18-al) by specifically blocking the conversion of 11-desoxy-corticosterone to aldosterone (hereinafter denoted as 18-hydroxylation-inhibition).

Merely by way of illustration some of the indole derivatives of the invention were screened to determine the degree of the 18-hydroxylation-inhibiting effect; 3-methyl-2-(3-pyridyl)-indole thereby demonstrated a marked inhibition of the synthesis of aldosterone.

Other representative compounds within the scope of the above formula which have been found to possess an inhibiting effect on the biosynthesis of aldosterone are particularly the following: 5-chloro-3-methyl-2-(3-pyridyl)-indole, 3-methyl-2-(4-pyridyl)-indole.

Their excellent 18-hydroxylation-inhibiting activity makes the compounds of the invention valuable in the treatment of certain conditions of adrenocortical hyperfunction. By virtue of their ability to block the excessive production of aldosterone in the adrenal cortex the inventive compounds are particularly useful as agents in the treatment of hyperaldosteronism and associated disorders and are useful diuretics; they exhibit cardiovascular properties.

The compounds of the invention can be administered as such or in the form of their non-toxic, pharmaceutically acceptable salts orally or, in the form of aqueous solutions of their non-toxic pharmaceutically acceptable salts, parenterally.

Non-toxic, pharmaceutically acceptable salts, i.e., salts with acids which in the necessary dosages are pharmacologically harmless, can be used directly as active substances for pharmaceuticals for oral or parenteral administration. They may be formed from said compounds in accordance with conventional practice, by using appropriate inorganic or organic acids, such as hydrochloric or hydrobromic acid, nitric acid, sulfuric acid, phosphoric acid, methane sulfonic acid, ethane sulfonic acid, β-hydroxyethane sulfonic acid, acetic acid, citric acid, benzoic acid, aminoacetic acid, lactic acid, succinic acid, malic acid, aconitic acid, phthalic acid, furmaric acid, salicyclic acid, maleic acid, tartaric acid, phenylacetic acid or mandelic acid.

The compounds of the invention are prepared by reacting an alkyl pyridyl ketone an appropriate phenylhydrazine and subsequently rearranging the resulting phenylhydrazone to the desired indole derivative.

The first step in this reaction, i.e. the formation of a phenylhydrazone, is carried out e.g. by heating the alkyl pyridyl ketone with the respective phenylhydrazine on a steam bath and crystallizing the possibly oily reaction product by scratching with the use of e.g. petroleum ether fractions as an inert medium. The resulting crystalline material can be used without further purification in the rearrangement step.

Rearrangement is achieved by refluxing the phenylhydrazone in water or alcohol, especially ethanol, in the presence of an acid. Acids, especially hydrochloric acid in the form of its saturated ethanolic solution can be used for this purpose. The resulting indole derivative is isolated from the reaction mixture by filtration or by removing the solvent under reduced pressure and recrystallizing the residue from appropriate solvents, e.g. water, diluted HCl, alcohol, especially methanol, or mixtures of alcohols with ether.

Examples of starting materials are the easily available phenylhydrazine and the 4-chlorine or 4-bromine substituted phenylhydrazines as well as the ethyl-3- and ethyl-4-pyridyl-ketones which can be prepared according to Engler, Ber. 24, 2539 (1891).

An alternative route to the inventive compounds involves the reaction of 3- or 4-pyridinecarboxylic acid halides with 2-ethylaniline or the 4-chlorine or 4-bromine derivatives thereof and the alkaline cyclization of the resulting intermediate pyridoylamides. The reaction is performed by slowly adding with stirring and at room temperature the acid chloride to the amine, both dissolved in anhydrous aromatic hydrocarbons such as benzene, toluene or the xylenes. The reaction is then completed by refluxing the mixture after all of the acid chloride has been added. Thereafter the intermediate pyridoylamide formed is cyclized without being isolated from the reaction mixture. The cyclization is effected by refluxing the reaction mixture after addition of an alkaline condensing agent, such as an alkali hydride or an alkali alkoxide, preferably sodium hydride or sodium methoxide. The reaction mixture is then decomposed by the addition of water and the organic phase is extracted with an acid, preferably hydrochloric acid. The acidic extract is made alkaline with an alkali hydroxide, preferably sodium hydroxide and the desired base is extracted with water-immiscible organic solvents such as aromatic hydrocarbons, ether or halogenated hydrocarbons, preferably chloroform or methylenechloride. The residue which remains after evaporation of the solvent is then treated in the usual manner for obtaining salts and the salt of the desired indole derivative is recovered from the reaction mixture.

The starting materials as used in the above described alternative route, viz., the pyridinecarboxylic acid halides and the substituted anilines are well known compounds.

Another method for the preparation of the compounds of the invention consists in heating a 2-halogeno-1-(3-or 4-pyridyl)-1-propanone with aniline or 4-chloro- or 4-bromo-aniline together with a salt of the latter compounds, preferably a salt thereof with hydrohalic, especially hydrochloric or hydrobromic acid. Indolization occurs and the resulting indole derivative is recovered from the reaction mixture and converted into its salt by methods well known in the art.

The 2-halogeno-1-(3- or 4-pyridyl)-1-propanones used as starting materials can be prepared analogous to M. Bieganowska and L. Kuczipnski, Acta. Polon. Pharm. 20, 15 (1963) starting from the known pyridylpropanones. The aniline derivatives used in the above reaction are well-known compounds.

The invention is illustrated by the following non-limitative examples. The temperatures are given in degrees centigrade. Percentages are given by weight.

EXAMPLE I

3-methyl-2-(3-pyridyl)-indole hydrochloride

A mixture of 0.5 g. ethyl-3-pyridyl ketone phenylhydrazone, 5 ml. of saturated ethanolic hydrochloric acid and 15 ml. of anhydrous ethanol is refluxed for 90 minutes. The solvent is then removed under reduced pressure and the crude yellow material recrystallized from methanol with charcoal treatment to obtain the desired compound, M.P. 245–247° (decomposition). Yield: 0.32 g. (59%).

*Analysis.*—Calc'd for $C_{14}H_{13}ClN_2$ (M.W. 244.72): C, 68.70; H, 5.37; N, 11.49. Found: C, 68.78; H, 5.47; N, 11.53.

EXAMPLE II

5-chloro-3-methyl-2-(3-pyridyl)-indole hydrochloride 1.72 g. of 4-chlorophenylhydrazine is heated with 1.6 g. of ethyl-3-pyridyl ketone on a steam bath for 1 hour. Then hexane is added to the reaction product and crystallization initiated by scratching. The tan crystalline material consisting of the 4-chlorophenylhydrazone of ethyl-3-pyridyl ketone is filtered off, M.P. 145–149°; yield: 2.84 g. (90.8%). 2.54 g. of the crude hydrazone described above is dissolved in 50 ml. of anhydrous ethanol, 5 ml. of saturated ethanolic HCl is added and the mixture refluxed for 1½ hours. The ethanol is then removed under reduced pressure, the residue suspended in benzene and concentrated to dryness again under reduced pressure. The crude product (M.P. 214–22°) is recrystallized twice from water, then from methanol to obtain the desired compound, M.P. 233–234°; yield: 790 mg. (28.3%).

*Analysis.*—Calc'd for $C_{14}H_{12}Cl_2N_2$ (M.W. 279.17): C, 60.23; H, 4.34; Cl, 25.39. Found: C, 60.49; H, 4.31; Cl, 25.40.

EXAMPLE III

3-methyl-2-(4-pyridyl)-indole hydrochloride

A mixture of 10.0 g. of ethyl-4-pyridyl ketone and 8.15 g. of phenylhydrazine is heated on a steam bath for 1½ hours. The obtained heavy oil is cooled and crystallization is induced by scratching under petroleum ether. The phenylhydrazone of ethyl-4-pyridyl ketone is filtered off. It consists of yellow crystals melting at 138–141°. Yield: 16.7 g. (100%).

7.5 g. of the above phenylhydrazone is dissolved in 230 ml. of anhydrous ethanol, 40 ml. of saturated ethanolic hydrochloric acid is added and the mixture refluxed for 30 minutes. Orange needles precipitated during this time. The reaction mixture is cooled, the crystals filtered off and washed with ether (M.P. 229–231°). After two recrystallizations from methanol/ether, the compound melts at 244.5–245.5° (decomp.). Yield: 6.6 g. (83.5%).

*Analysis.*—Calc'd for $C_{14}H_{13}ClN_2$ (M.W. 244.72): C, 68.70; H, 5.37; N, 11.49. Found: C, 68.91; H, 5.48; N, 11.41.

EXAMPLE IV

3-methyl-3-(3-pyridyl)-indole hydrochloride 12 g. 2-ethylaniline is dissolved in 200 ml. of anhydrous toluene and a solution of 14.1 g. of nicotinylchloride in 200 ml. of anhydrous toluene is added dropwise with stirring at 15–20° C. After complete addition, the resulting reaction mixture is refluxed for 30 minutes and cooled. Then 5.3 g. of sodium hydride is slowly added and the resulting mixture is refluxed for 20 hours. The mixture is then decomposed by the addition of water, the two layers separated and the organic layer extracted with 3 N hydrochloric acid. The acidic extract is made alkaline with sodium hydroxide and the liberated base extracted with chloroform. The organic extract is dried ($Na_2SO_4$), filtered and the solvent removed under reduced pressure. The solid residue is dissolved in a small amount of ethanol and enough ethanolic HCl is added to form the hydrochloride. The mixture is evaporated to dryness and the hydrochloride of 3-methyl-2-(3-pyridyl)indole purified by recrystallization from 1 N hydrochloric acid; the compound melted at 245–247° (decomposition).

*Analysis.*—Calc'd for $C_{14}H_{13}ClN_2$ (M.W. 244.72): C, 68.70; H, 5.37; N, 11.49. Found: C, 68.78; H, 5.47; N, 11.53.

EXAMPLE V

3-methyl-2-(4-pyridyl)-indole hydrochloride 21.4 g. of 1-propanone-2-bromo-1-(4-pyridyl)-hydrobromide is treated with 30 ml. of aniline and 9 g. of aniline hydrobromide at 115–120° for three hours. After cooling, 100 ml. of 1 N NaOH and enough ether is added to allow for a clean separation of the two phases. The aqueous phase is extracted two more times and the combined organic extracts dried over $Na_2SO_4$, filtered and the solvent including the excess aniline are removed under reduced pressure. The residue is dissolved in a small amount of hot ethanol and enough ethanolic HCl is added to form the hydrochloride. The hot solution of the salt is treated with charcoal and allowed to cool after filtration. The obtained yellow, crystalline solid is filtered off and recrystallized from methanol/ether; the desired compound melts at 244.5–245.5° C.

*Analysis.*—Calc'd for $C_{14}H_{13}ClN_2$ (M.W. 244.72): C, 68.70; H, 5.37; N, 11.49. Found: C, 68.91; H, 5.48; N, 11.41.

As mentioned above, the new active substances can be administered in a therapeutically effective amount to a host, such a mammal, orally or parenterally. Suitable dosage units, such as coated tablets, tablets or ampoules preferably contain about 500 mg. of an active substance according to the invention or of a pharmaceutically acceptable, non-toxic salt thereof. Dosage units for oral administration preferably contain between about 1% and about 90% of a compound of the above formula or of a pharmaceutically acceptable, non-toxic salt thereof as active substance.

Dosage units are produced, e.g. by combining the active substance with solid, pulverulent carriers such as lactose, saccharose, sorbitol, mannitol; starches such as potato starch, maize starch or amylopectin, also laminaria powder or citrus pulp powder; cellulose derivatives or gelatin, optionally with the addition of lubricants such as magnesium or calcium stearate or polyethylene glycols (Carbowax) of suitable molecular weights, to form tablets or coated tablet cores. The latter are coated, e.g. with concentrated sugar solutions which can also contain, e.g. gum arabic, talcum and/or titanium dioxide, or with a lacquer dissolved in easily volatile organic solvents or mixtures of solvents. Dyestuffs can be added to these coatings, e.g. to distinguish between varying dosages of active substance.

Ampoules for parenteral, particularly, i.v. administration preferably contain a water soluble pharmaceutically acceptable salt of an active substance in a concentration of, preferably, 0.5% to 5.0% in aqueous solution, optionally together with suitable stabilizers and buffer substances.

The production of dosage units can be illustrated as follows:

COATED TABLETS

Ingredients: G.
(1) 5-chloro-3-methyl-2 - (3 - pyridyl)indole hydrochloride _____ 500.0
(2) Lactose _____ 80.0
(3) Corn-starch _____ 70.0
(4) Soluble starch _____ 15.0
(5) Magnesium stearate _____ 5.0
_____
670.0

(1), (2) and (3) are thoroughly mixed, the mix is granulated with an aqueous solution of (4), the dried granulate is mixed with (5) and pressed into 670.0 milligram tablet cores.

Each tablet core contains 500.0 milligrams of active substance (1) and is sugar coated according to the usual art practices. Color may be added to the coating.

PARENTERAL SOLUTION

G.
(1) 3-methyl-2-(3-pyridyl)-indole mesylate _____ 50.0
(2) Chlorobutanol _____ 3.0
(3) Water for injection q.s. ad 1000 cc.

(1) and (2) are dissolved in (3), sterilized and filled into vials and multiple dose vials.

What is claimed is:
1. A compound of the formula

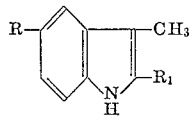

wherein:

R represents hydrogen, chlorine or bromine, and
$R_1$ represents 3-pyridyl or 4-pyridyl.

2. A pharmaceutically acceptable acid addition salt of a compound as defined in claim 1.

3. A compound as defined in claim 1 wherein:
R represents hydrogen or chlorine, and
$R_1$ represents 3-pyridyl.

4. A compound as defined in claim 1 which is 3-methyl-2-(3-pyridyl)-indole.

5. A compound as defined in claim 1 which is 5-chloro-3-methyl-2-(3-pyridyl)-indole.

6. A compound as defined in claim 1 which is 3-methyl-2-(4-pyridyl)-indole.

References Cited

Lakshmanan: Chem. Abstracts, vol. 55, par. 528, 1961.
Huffman: Chem. Abstracts, vol. 57, par. 773, 1962.
Bradsher et al.: J. Org. Chem., vol. 29, No. 12; pp. 3584–6, 1964. Chem. Abstracts, vol. 57, par. 3419-d-g, 1962.

HENRY R. JILES, Primary Examiner
A. L. ROTMAN, Assistant Examiner

U.S. Cl. X.R.
260—294, 295, 296, 297; 424—263, 266